(12) United States Patent
Woolfork

(10) Patent No.: US 10,129,627 B2
(45) Date of Patent: *Nov. 13, 2018

(54) WIRELESS DIGITAL AUDIO MUSIC SYSTEM

(71) Applicant: C. Earl Woolfork, Pasadena, CA (US)

(72) Inventor: C. Earl Woolfork, Pasadena, CA (US)

(73) Assignee: ONE-E-WAY, INC., Pasadena, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 15/003,242

(22) Filed: Jan. 21, 2016

(65) Prior Publication Data

US 2017/0214995 A1 Jul. 27, 2017
US 2018/0270561 A9 Sep. 20, 2018

Related U.S. Application Data

(63) Continuation of application No. 13/775,754, filed on Feb. 25, 2013, now Pat. No. 9,282,396, which is a (Continued)

(51) Int. Cl.

| G06F 17/00 | (2006.01) |
|---|---|
| H04R 1/10 | (2006.01) |
| G10L 19/005 | (2013.01) |
| G10L 19/16 | (2013.01) |
| G10L 25/33 | (2013.01) |

(Continued)

(52) U.S. Cl.
CPC .......... *H04R 1/1041* (2013.01); *G10L 19/005* (2013.01); *G10L 19/167* (2013.01); *G10L 25/33* (2013.01); *H04B 1/707* (2013.01); *H04R 3/04* (2013.01); *H04R 2420/07* (2013.01)

(58) Field of Classification Search
CPC .. H04R 1/1083; H04R 2420/07; H04R 5/033; H04M 1/6066
See application file for complete search history.

(56) References Cited

U.S. PATENT DOCUMENTS 5,175,558 A * 12/1992 DuPree .................... G01S 7/36
                                                                342/378
5,530,929 A   5/1996 Lindqvist et al.
(Continued)

OTHER PUBLICATIONS

"A Coherent Dual-Channel QPSK Modulation for CDMA Systems," Kim et al. Copyright 1996.*
(Continued)

*Primary Examiner* — Andrew C Flanders
(74) *Attorney, Agent, or Firm* — Knobbe, Martens, Olson & Bear, LLP

(57) ABSTRACT

A wireless digital audio system includes a portable audio source with a digital audio transmitter operatively coupled thereto and an audio receiver operatively coupled to a headphone set. The audio receiver is configured for digital wireless communication with the audio transmitter. The digital audio receiver utilizes fuzzy logic to optimize digital signal processing. Each of the digital audio transmitter and receiver is configured for code division multiple access (CDMA) communication. The wireless digital audio system allows private audio enjoyment without interference from other users of independent wireless digital transmitters and receivers sharing the same space.

12 Claims, 3 Drawing Sheets

Related U.S. Application Data continuation of application No. 13/356,949, filed on Jan. 24, 2012, now Pat. No. 9,107,000, which is a continuation of application No. 12/940,747, filed on Nov. 5, 2010, now Pat. No. 8,131,391, which is a continuation of application No. 12/570,343, filed on Sep. 30, 2009, now Pat. No. 7,865,258, which is a continuation of application No. 12/144,729, filed on Jul. 12, 2008, now Pat. No. 7,684,885, which is a continuation of application No. 10/648,012, filed on Aug. 26, 2003, now Pat. No. 7,412,294, which is a continuation-in-part of application No. 10/027,391, filed on Dec. 21, 2001, now abandoned.

(51) Int. Cl.
*H04R 3/04* (2006.01)
*H04B 1/707* (2011.01)

(56) References Cited

U.S. PATENT DOCUMENTS

| | | | | | |
|---|---|---|---|---|---|
| 5,771,441 | A * | 6/1998 | Altstatt | ............... | H01Q 1/24 343/718 |
| 5,946,343 | A * | 8/1999 | Schotz | ............... | H04B 1/04 375/141 |
| 6,130,643 | A * | 10/2000 | Trippett | ............... | G01S 7/36 342/380 |
| 6,342,844 | B1 * | 1/2002 | Rozin | ............... | G07B 15/063 340/928 |
| 6,418,558 | B1 * | 7/2002 | Roberts | ............... | G06F 17/14 348/E7.07 |
| 6,563,892 | B1 | 5/2003 | Haartsen et al. | | |
| 6,678,892 | B1 * | 1/2004 | Lavelle | ............... | G06F 3/1423 348/837 |
| 6,982,132 | B1 * | 1/2006 | Goldner | ............... | E06B 9/24 204/192.11 |
| 7,047,474 | B2 * | 5/2006 | Rhee | ............... | H03M 13/1515 714/755 |
| 7,099,413 | B2 * | 8/2006 | Chuang | ............... | H04L 25/0204 370/210 |
| 2001/0025358 | A1 * | 9/2001 | Eidson | ............... | H03M 13/09 714/752 |
| 2001/0033621 | A1 * | 10/2001 | Khayrallah | ............... | H03M 7/3002 375/244 |
| 2002/0065043 | A1 * | 5/2002 | Hamada | ............... | H04W 28/06 455/41.3 |
| 2004/0223622 | A1 * | 11/2004 | Lindemann | ............... | H04R 5/04 381/79 |

OTHER PUBLICATIONS

Petition for Inter Partes Review of U.S. Pat. No. 9,282,396, *Sony Corporation v. One-E-Way, Inc.*, Case No. IPR2016-01638, as filed Aug. 19, 2016, 59 pages.
Patent Owner One-E-Way's Preliminary Response to Petition for Inter Partes Review of U.S. Pat. No. 9,282,396, *Sony Corporation v. One-E-Way, Inc.*, Case No. IPR2016-01638, as filed Nov. 25, 2016, 20 pages.
Petitioner's Reply to Patent Owner's Preliminary Response to Petition for Inter Partes Review of U.S. Pat. No. 9,282,396, *Sony Corporation v. One-E-Way, Inc.*, Case No. IPR2016-01638, as filed Feb. 8, 2017, 11 pages.
Decision Instituting Inter Partes Review of U.S. Pat. No. 9,282,396, *Sony Corporation v. One-E-Way, Inc.*, Case No. IPR2016-01638, as filed Feb. 22, 2017, 19 pages.
Index to Exhibits, *Sony Corporation v. One-E-Way, Inc.*, Case No. IPR2016-01638, as filed May 22, 2017, 2 pages.
Patent Owner Response to Petition for Inter Partes Review of U.S. Pat. No. 9,282,396, *Sony Corporation v. One-E-Way, Inc.*, Case No. IPR2016-01638, as filed Jun. 2, 2017, 55 pages.
Reply in Support of Petition for Inter Partes Review of U.S. Pat. No. 9,282,396, *Sony Corporation v. One-E-Way, Inc.*, Case No. IPR2016-01638, as filed Aug. 25, 2017, 23 pages.
Record of Oral Hearing Held Nov. 6, 2017, *Sony Corporation v. One-E-Way, Inc.*, Case No. IPR2016-01638 and Case No. IPR2016-01639, Nov. 6, 2017, 71 pages.
Exhibit 1008 Comparison of 2001 Application Specification and 2003 Application Specification as Originally Filed, *Sony Corporation v. One-E-Way, Inc.*, Case No. IPR2016-01638, 9 pages.
Exhibit 1009 Comparison of Figures from 2001 Application and 2003 Application as Originally Filed, *Sony Corporation v. One-E-Way, Inc.*, Case No. IPR2016-01638, 3 pages.
Exhibit 1010 Comparison of 2003 Application Specification as Originally Filed and Issued U.S. Pat. No. 7,412,294, *Sony Corporation v. One-E-Way, Inc.*, Case No. IPR2016-01638, 19 pages.
Exhibit 1011 Comparison of 2008 Application Specification and Specification of U.S. Pat. No. 9,282,396 as Originally Filed, *Sony Corporation v. One-E-Way, Inc.*, Case No. IPR2016-01638, 9 pages.
Exhibit 1012 John T. Moring Aug. 18, 2016 Signed Declaration, *Sony Corporation v. One-E-Way, Inc.*, Case No. IPR2016-01638, 29 pages.
Exhibit 1013 Order No. 12: Construing Terms of the Asserted Patents in the matter of Certain Consumer Electronics and Display Devices With Graphics Processing and Graphics Processing Units Therein, *Sony Corporation v. One-E-Way, Inc.*, Case No. IPR2016-01638, 49 pages.
Petitioner's Presentation for Case No. IPR2016-01638 and Case No. IPR2016-01638, *Sony Corporation v. One-E-Way, Inc.*, dated Nov. 6, 2017, 62 pages.
Patent Owner's Oral Hearing Presentation for Case No. IPR2016-01638, *Sony Corporation v. One-E-Way, Inc.*, dated Nov. 6, 2017, 24 pages.
Patent Owner's Oral Hearing Presentation for Case No. IPR2016-01639, *Sony Corporation v. One-E-Way, Inc.* dated Nov. 6, 2017, 18 pages.
Petition for Inter Partes Review of U.S. Pat. No. 9,282,396, *Sony Corporation v. One-E-Way, Inc.*, Case No. IPR2016-01639, as filed Aug. 19, 2016, 85 pages.
Patent Owner One-E-Way's Preliminary Response to Petition for Inter Partes Review, *Sony Corporation v. One-E-Way, Inc.*, Case No. IPR2016-01639, as filed Nov. 25, 2016, 70 pages.
Decision Instituting Inter Partes Review of U.S. Pat. No. 9,282,396, *Sony Corporation v. One-E-Way, Inc.*, Case No. IPR2016-01639, as filed Feb. 22, 2017, 26 pages
Index to Exhibits, *Sony Corporation v. One-E-Way, Inc.*, Case No. IPR2016-01639, as filed May 22, 2017, 3 pages.
Patent Owner's Response to Petition for Inter Partes Review of U.S. Pat. No. 9,282,396, *Sony Corporation v. One-E-Way, Inc.*, Case No. IPR2016-01639, as filed Jun. 2, 2017, 62 pages.
Reply in Support of Petition for Inter Partes Review of U.S. Pat. No. 9,282,396, *Sony Corporation v. One-E-Way, Inc.*, Case No. IPR2016-01639, as filed Aug. 25, 2017, 24 pages.
Exhibit 1006 U.S. Pat. No. 6,563,892, *Sony Corporation v. One-E-Way, Inc.*, Case No. IPR2016-01639, 17 pages.
Exhibit 1007 Haartsen Article regarding Bluetooth—The Universal Radio (1998), *Sony Corporation v. One-E-Way, Inc.*, Case No. IPR2016-01639, 10 pages.
Exhibit 1008 Haartsen, The Bluetooth Radio System (2000), *Sony Corporation v. One-E-Way, Inc.*, Case No. IPR2016-01639, 12 pages.
Exhibit 1009 Giannakis Article regarding Load-Adaptive MUI ISI-Resilient, *Sony Corporation v. One-E-Way, Inc.*, Case No. IPR2016-01639, 14 pages.
Exhibit 1013 John Moring Aug. 18, 2016 Signed Declaration, *Sony Corporation v. One-E-Way, Inc.*, Case No. IPR2016-01639, 67 pages.
Exhibit 1015 Sony Direct Infringement Claim Charts, *Sony Corporation v. One-E-Way, Inc.*, Case No. IPR2016-01639, 140 pages.
Exhibit 1017 U.S. Pat. No. 5,530,929, *Sony Corporation v. One-E-Way, Inc.*, Case No. IPR2016-01639, 4 pages.
Exhibit 2001 Joseph C. McAlexander III, P.E., Signed Declaration and CV, *Sony Corporation v. One-E-Way, Inc.*, Case No. IPR2016-01639, 34 pages.

(56) References Cited

OTHER PUBLICATIONS

Exhibit 2002 Zhou Frequency-Hopped Paper, *Sony Corporation v. One-E-Way, Inc.*, Case No. IPR2016-01639, 5 pages.
Exhibit 2003 Fredman Paper, *Sony Corporation v. One-E-Way, Inc.*, Case No. IPR2016-01639, 6 pages.
Exhibit 2004 Lee Paper, *Sony Corporation v. One-E-Way, Inc.*, Case No. IPR2016-01639, 7 pages.
Exhibit 2006 Transcript of Deposition Held May 24, 2017, *Sony Corporation v. One-E-Way, Inc.*, Case No. IPR2016-01639, 98 pages.
Exhibit 2007 Supplemental Declaration by Joseph C. McAlexander, P.E., *Sony Corporation v. One-E-Way, Inc.*, Case No. IPR2016-01639, 9 pages.
Petition for Inter Partes Review of U.S. Pat. No. 7,865,258, *Sony Corporation v. One-E-Way, Inc.*, Case No. IPR2018-00216, as filed Nov. 22, 2017, 59 pages
Petitioner's Exhibit List, *Sony Corporation v. One-E-Way, Inc.*, Case No. IPR2018-00216, as filed Nov. 22, 2017, 1 page.
Exhibit 1012 Moring Declaration dated Nov. 21, 2017, *Sony Corporation v. One-E-Way, Inc.*, Case No. IPR2018-00216, 30 pages.
Petition for Inter Partes Review of U.S. Pat. No. 7,865,258, *Sony Corporation v. One-E-Way, Inc.*, Case No. IPR2018-00217, as filed Nov. 22, 2017, 70 pages.
Petitioner's Exhibit List, *Sony Corporation v. One-E-Way, Inc.*, Case No. IPR2018-00217, as filed Nov. 22, 2017, 1 page.
Exhibit 1012 Moring Declaration dated Nov. 17, 2017, *Sony Corporation v. One-E-Way, Inc.*, Case No. IPR2018-00217, 63 pages.
Petition for Inter Partes Review of U.S. Pat. No. 8,131,391, *Sony Corporation v. One-E-Way, Inc.*, Case No. IPR2018-00218, as filed Nov. 22, 2017, 61 pages.
Petitioner's Exhibit List, *Sony Corporation v. One-E-Way, Inc.*, Case No. IPR2018-00218, as filed Nov. 22, 2017, 1 page.
Exhibit 1012 Moring Declaration dated Nov. 21, 2017, *Sony Corporation v. One-E-Way, Inc.*, Case No. IPR2018-00218, 32 pages.
Petition for Inter Partes Review of U.S. Pat. No. 8,131,391, *Sony Corporation v. One-E-Way, Inc.*, Case No. IPR2018-00219, as filed Nov. 22, 2017, 74 pages.
Petitioner's Exhibit List, *Sony Corporation v. One-E-Way, Inc.*, Case No. IPR2018-00219, as filed Nov. 22, 2017, 1 page.
Exhibit 1012 Moring Declaration dated Nov. 17, 2017, *Sony Corporation v. One-E-Way, Inc.*, Case No. IPR2018-00219, 67 pages.

\* cited by examiner

WIRELESS DIGITAL AUDIO MUSIC SYSTEM

This continuation application claims the benefit of U.S. patent application Ser. No. 13/775,754 filed Feb. 25, 2013, which is a continuation application claiming benefit of U.S. patent application Ser. No. 13/356,949 filed Jan. 24, 2012, which was a continuation application claiming the benefit of U.S. patent application Ser. No. 12/940,747 filed Nov. 5, 2010, now U.S. Pat. No. 8,131,391, which was a continuation application claiming the benefit of U.S. patent application Ser. No. 12/570,343 filed Sep. 30, 2009, now U.S. Pat. No. 7,865,258, which was a continuation claiming the benefit of U.S. patent application Ser. No. 12/144,729 filed Jul. 12, 2008, now U.S. Pat. No. 7,684,885, which was a continuation claiming benefit of U.S. patent application Ser. No. 10/648,012 filed Aug. 26, 2003, now U.S. Pat. No. 7,412,294, which was a continuation-in-part claiming benefit from U.S. patent application Ser. No. 10/027,391, filed Dec. 21, 2001, for "Wireless Digital Audio System," published under US 2003/0118196 A1 on Jun. 26, 2003, now abandoned, the disclosures of which are incorporated herein in their entireties by reference.

BACKGROUND OF THE INVENTION

This invention relates to audio player devices and more particularly to systems that include headphone listening devices. The new audio system uses an existing headphone jack (i.e., this is the standard analog headphone jack that connects to wired headphones) of a music audio player (i.e., portable CD player, portable cassette player, portable A.M./F.M. radio, laptop/desktop computer, portable MP3 player, and the like) to connect a battery powered transmitter for wireless transmission of a signal to a set of battery powered receiving headphones.

Use of audio headphones with audio player devices such as portable CD players, portable cassette players, portable A.M./F.M. radios, laptop/desktop computers, portable MP3 players and the like have been in use for many years. These systems incorporate an audio source having an analog headphone jack to which headphones may be connected by wire.

There are also known wireless headphones that may receive A.M. and F.M. radio transmissions. However, they do not allow use of a simple plug in (i.e., plug in to the existing analog audio headphone jack) battery powered transmitter for connection to any music audio player device jack, such as the above mentioned music audio player devices, for coded wireless transmission and reception by headphones of audio music for private listening without interference where multiple users occupying the same space are operating wireless transmission devices. Existing audio systems make use of electrical wire connections between the audio source and the headphones to accomplish private listening to multiple users.

There is a need for a battery powered simple connection system for existing music audio player devices (i.e., the previously mentioned music devices), to allow coded digital wireless transmission (using a battery powered transmitter) to a headphone receiver (using a battery powered receiver headphones) that accomplishes private listening to multiple users occupying the same space without the use of wires.

SUMMARY OF THE INVENTION

The present invention is generally directed to a wireless digital audio system for coded digital transmission of an audio signal from any audio player with an analog headphone jack to a receiver headphone located away from the audio player. Fuzzy logic technology may be utilized by the system to enhance bit detection. A battery-powered digital transmitter may include a headphone plug in communication with any suitable music audio source. For reception, a battery-powered headphone receiver may use embedded fuzzy logic to enhance user code bit detection. Fuzzy logic detection may be used to enhance user code bit detection during decoding of the transmitted audio signal. The wireless digital audio music system provides private listening without interference from other users or wireless devices and without the use of conventional cable connections.

These and other features, aspects and advantages of the present invention will become better understood with reference to the following drawings, description and claims.

BRIEF DESCRIPTION OF THE DRAWINGS

Some aspects of the present invention are generally shown by way of reference to the accompanying drawings in which.

DETAILED DESCRIPTION

The following detailed description is the best currently contemplated modes for carrying out the invention. The description is not to be taken in a limiting sense, but is made merely for the purpose of illustrating the general principles of the invention.

Figure 1:
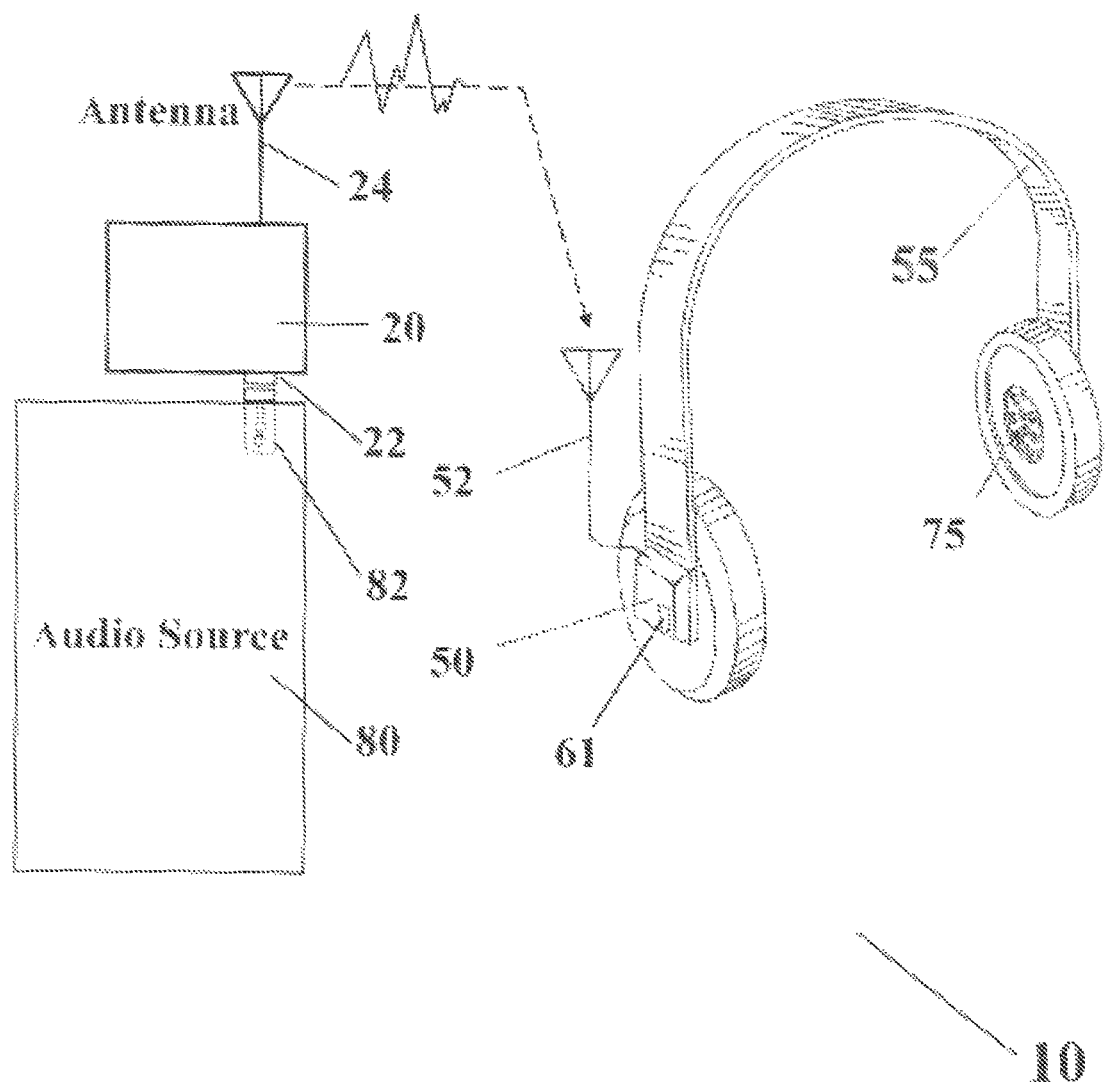
FIG. 1 schematically illustrates a wireless digital audio system in accordance with the present invention.
Figure 2:
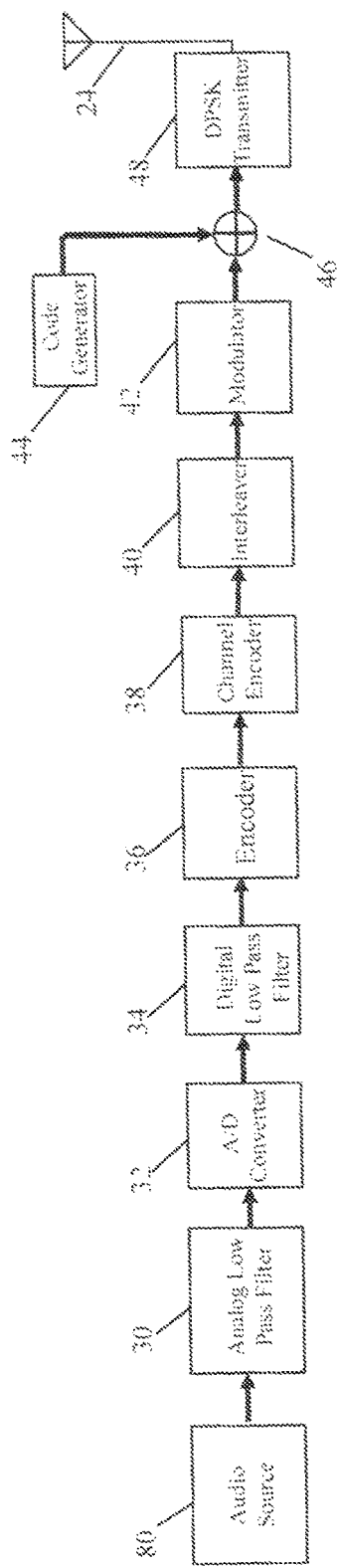
FIG. 2 is a block diagram of an audio transmitter portion of the wireless digital audio system of FIG. 1.
Figure 3:
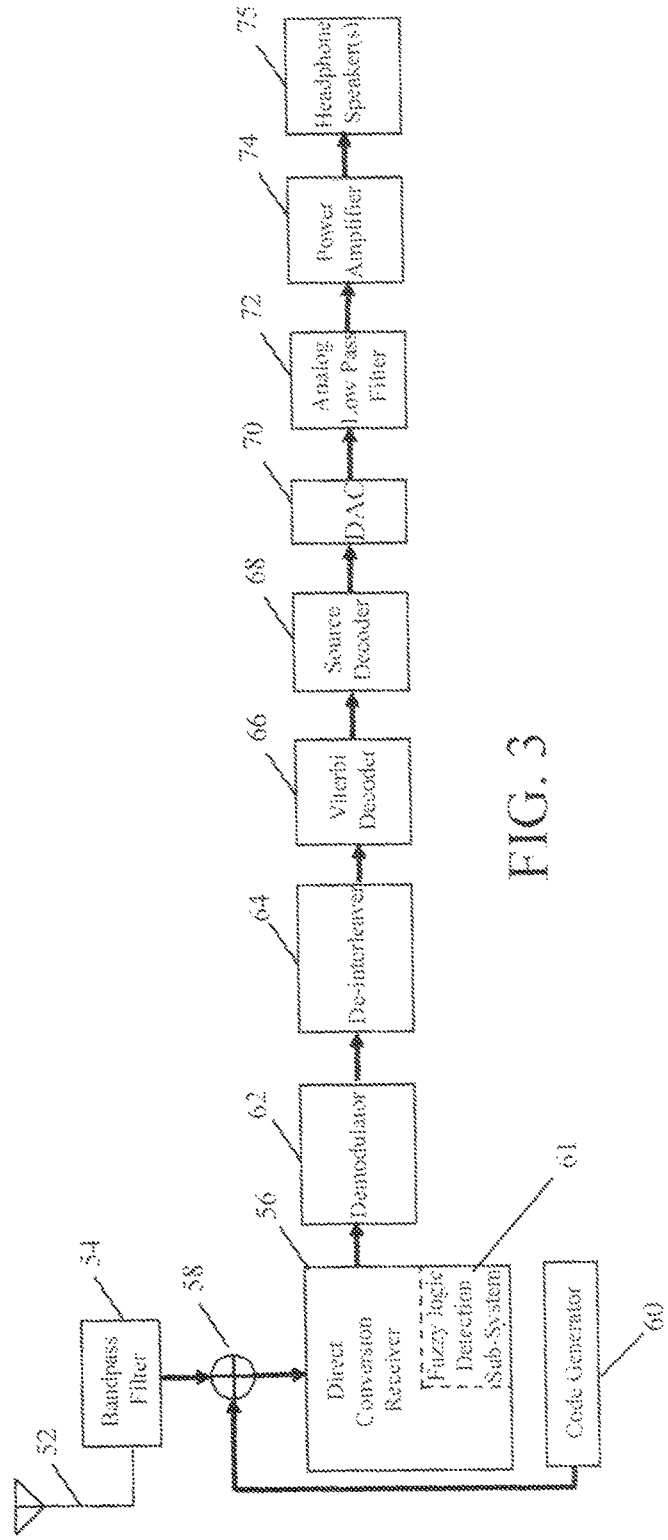
FIG. 3 is a block diagram of an audio receiver portion of the wireless digital audio system of FIG. 1.

Referring to FIGS. 1 through 3, a wireless digital audio music system 10 may include a battery powered transmitter 20 connected to a portable music audio player or music audio source 80. The battery powered wireless digital audio music transmitter 20 utilizes an analog to digital converter or ADC 32 and may be connected to the music audio source 80 analog headphone jack 82 using a headphone plug 22. The battery powered transmitter 20 may have a transmitting antenna 24 that may be omni-directional for transmitting a spread spectrum modulated signal to a receiving antenna 52 of a battery powered headphone receiver 50. The battery powered receiver 50 may have headphone speakers 75 in headphones 55 for listening to the spread spectrum demodulated and decoded communication signal. In the headphone receiver 50, fuzzy logic detection may be used to optimize reception of the received user code. The transmitter 20 may digitize the audio signal using ADC 32. The digitized signal may be processed downstream by an encoder 36. After digital conversion, the digital signal may be processed by a digital low pass filter. To reduce the effects of channel noise, the battery powered transmitter 20 may use a channel encoder 38. A modulator 42 modulates the digital signal to be transmitted. For further noise immunity, a spread spectrum DPSK (differential phase shift key) transmitter or module 48, is utilized. The battery powered transmitter 20 may contain a code generator 44 that may be used to create a unique user code. The unique user code generated is specifically associated with one wireless digital audio system user, and it is the only code recognized by the battery powered headphone receiver 50 operated by a particular user. The radio frequency (RF) spectrum utilized (as taken from the Industrial, Scientific and Medical (ISM) band) may be approximately 2.4 GHz. The power radiated by the transmitter adheres to the ISM standard.

Particularly, the received spread spectrum signal may be communicated to a 2.4 GHz direct conversion receiver or module 56. Referring to FIGS. 1 through 4, the spread spectrum modulated signal from transmit antenna 24 may be received by receiving antenna 52 and then processed by spread spectrum direct conversion receiver or module 56 with a receiver code generator 60 that contains the same transmitted unique code, in the battery powered receiver 50 headphones. The transmitted signal from antenna 24 may be received by receiving antenna 52 and communicated to a wideband bandpass filter (BPF). The battery powered receiver 50 may utilize embedded fuzzy logic 61 (as graphically depicted in FIGS. 1, 4) to optimize the bit detection of the received user code. The down converted output signal of direct conversion receiver or module 56 may be summed by receiver summing element 58 with a receiver code generator 60 signal. The receiver code generator 60 may contain the same unique wireless transmission of a signal code word that was transmitted by audio transmitter 20 specific to a particular user. Other code words from wireless digital audio systems 10 may appear as noise to audio receiver 50. This may also be true for other device transmitted wireless signals operating in the wireless digital audio spectrum of digital audio system 10. This code division multiple access (CDMA) may be used to provide each user independent audible enjoyment. The resulting summed digital signal from receiving summary element 58 and direct conversion receiver or module 56 may be processed by a 64-Ary demodulator 62 to demodulate the signal elements modulated in the audio transmitter 20. A block de-interleaver 64 may then decode the bits of the digital signal encoded in the block interleaver 40. Following such, a Viterbi decoder 66 may be used to decode the bits encoded by the channel encoder 38 in audio transmitter 20. A source decoder 68 may further decode the coding applied by encoder 36.

Each receiver headphone 50 user may be able to listen (privately) to high fidelity audio music, using any of the audio devices listed previously, without the use of wires, and without interference from any other receiver headphone 50 user, even when operated within a shared space. The fuzzy logic detection technique 61 used in the receiver 50 could provide greater user separation through optimizing code division in the headphone receiver.

The battery powered transmitter 20 sends the audio music information to the battery powered receiver 50 in digital packet format. These packets may flow to create a digital bit stream rate less than or equal to 1.0 Mbps.

The user code bits in each packet may be received and detected by a fuzzy logic detection sub-system 61 (as an option) embedded in the headphone receiver 50 to optimize audio receiver performance. For each consecutive packet received, the fuzzy logic detection sub-system 61 may compute a conditional density with respect to the context and fuzziness of the user code vector, i.e., the received code bits in each packet. Fuzziness may describe the ambiguity of the high (1)/low (0 or −1) event in the received user code within the packet. The fuzzy logic detection sub-system 61 may measure the degree to which a high/low bit occurs in the user code vector, which produces a low probability of bit error in the presence of noise. The fuzzy logic detection sub-system 61 may use a set of if-then rules to map the user code bit inputs to validation outputs. These rules may be developed as if-then statements.

Figure 4:
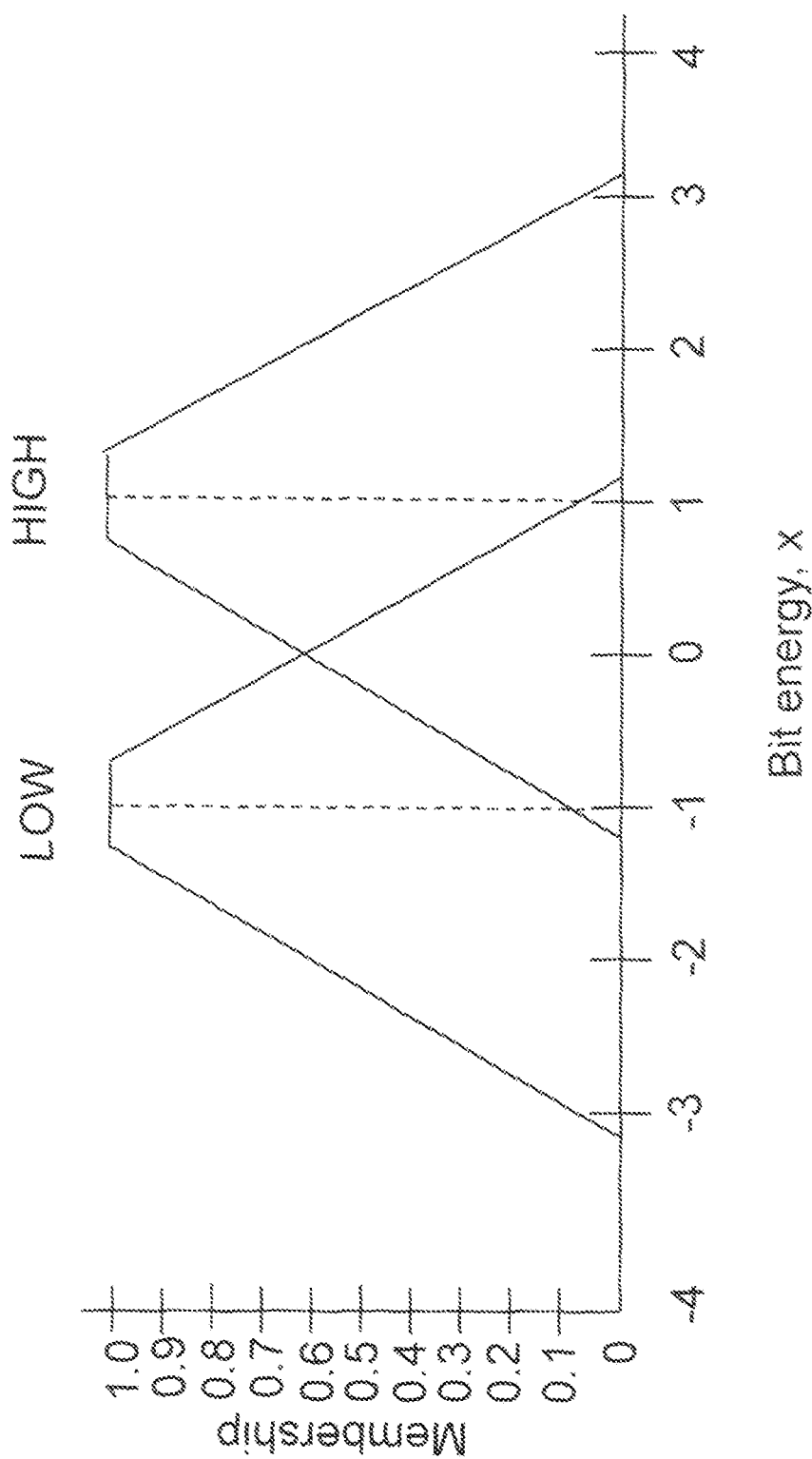
FIG. 4 is an exemplary graph showing the utilization of an embedded fuzzy logic coding algorithm according to one embodiment of the present invention.

Fuzzy logic detection sub-system 61 in battery-powered headphone receiver 50 utilizes the if-then fuzzy set to map the received user code bits into two values: a low (0 or −1) and a high (1). Thus, as the user code bits are received, the "if" rules map the signal bit energy to the fuzzy set low value to some degree and to the fuzzy set high value to some degree. FIG. 4 graphically shows that x-value −1 equals the maximum low bit energy representation and x-value 1 equals the maximum high bit energy representation. Due to additive noise, the user code bit energy may have some membership to a low and high as represented in FIG. 4. The if-part fuzzy set may determine if each bit in the user code, for every received packet, has a greater membership to a high bit representation or a low bit representation. The more a user code bit energy fits into the high or low representation, the closer its subsethood, i.e., a measure of the membership degree to which a set may be a subset of another set, may be to one.

The if-then rule parts that make up the fuzzy logic detection sub-system 61 must be followed by a defuzzifying operation. This operation reduces the aforementioned fuzzy set to a bit energy representation (i.e., −1 or 1) that is received by the transmitted packet. Fuzzy logic detection sub-system 61 may be used in battery-powered headphone receiver 50 to enhance overall system performance.

The next step may process the digital signal to return the signal to analog or base band format for use in powering speaker(s) 75. A digital-to-analog converter 70 (DAC) may be used to transform the digital signal to an analog audio signal. An analog low pass filter 72 may be used to filter the analog audio music signal to pass a signal in the approximate 20 Hz to 20 kHz frequency range and filter other frequencies. The analog audio music signal may then be processed by a power amplifier 74 that may be optimized for powering headphone speakers 75 to provide a high quality, low distortion audio music for audible enjoyment by a user wearing headphones 55. A person skilled in the art would appreciate that some of the embodiments described hereinabove are merely illustrative of the general principles of the present invention. Other modifications or variations may be employed that are within the scope of the invention. Thus, by way of example, but not of limitation, alternative configurations may be utilized in accordance with the teachings herein. Accordingly, the drawings and description are illustrative and not meant to be a limitation thereof.

Moreover, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Thus, it is intended that the invention cover all embodiments and variations thereof as long as such embodiments and variations come within the scope of the appended claims and their equivalents.

The invention claimed is:

1. A wireless digital audio spread spectrum receiver, capable of mobile operation, configured to receive a unique user code and a high quality audio signal representation with a frequency range of 20 Hz to 20 kHz from a digital audio spread spectrum transmitter, said audio signal representation representative of audio from a portable audio source, said digital audio spread spectrum receiver operative to communicate wirelessly with said digital audio spread spectrum transmitter, said digital audio spread spectrum receiver comprising:
- a direct conversion module configured to receive wireless spread spectrum signal transmissions representative of the unique user code and the high quality audio signal representation, wherein the received transmissions are encoded to reduce intersymbol interference, wherein the wireless digital audio spread spectrum receiver is capable of processing the high quality audio signal having a frequency range of 20 Hz to 20 kHz;
- a digital-to-analog converter (DAC) configured to generate an audio output from said receiver audio signal representation; and
- a speaker configured to reproduce said generated audio output, wherein said reproduction does not include audible audio content originating from any transmitted audio signals in the wireless digital audio spread spectrum transmitter spectrum that do not originate from said digital audio spread spectrum transmitter;
- wherein the wireless digital audio spread spectrum receiver is configured to use independent code division multiple access communication and to use the received unique user code to communicate with only said wireless digital audio spread spectrum transmitter for the duration of a wireless connection; and
- wherein the wireless digital audio spread spectrum receiver is further configured to:
- demodulate a received modulated transmission, and
- generate a demodulated signal based on the received modulated transmission by performing at least one of a plurality of demodulations, wherein the plurality of demodulations includes a differential phase shift keying (DPSK) demodulation and also includes a non-DPSK demodulation.

2. The wireless digital audio spread spectrum receiver of claim 1, wherein said audio from said portable audio source is music.

3. A portable spread spectrum audio receiver, configured to receive and store a unique user code, said portable spread spectrum receiver configured to receive wireless transmission from a spread spectrum transmitter, said wireless transmissions representative of a high quality audio signal representation with a frequency range of 20 Hz to 20 kHz, said portable spread spectrum audio receiver comprising:
- a direct conversion module configured to receive wireless transmissions representative of the high quality audio signal representation, wherein the received wireless transmissions are encoded to reduce intersymbol interference;
- a decoder operative to decode the demodulated transmission and to generate a receiver audio signal representation, the decoder configured to decode reduced intersymbol interference coding and to decode representations of audio in the frequency range of 20 Hz to 20 kHz;
- a digital-to-analog converter (DAC) configured to generate an audio output from said receiver audio signal representation; and
- a speaker configured to reproduce said generated audio output, wherein said reproduction does not include audible audio content originating from any transmitted audio signals in the spread spectrum transmitter spectrum that do not originate from said spread spectrum transmitter;
- wherein the portable spread spectrum audio receiver is configured to use independent code division multiple access communication and to use the received unique user code to communicate with only said spread spectrum transmitter for the duration of a wireless connection;
- wherein the wireless digital audio spread spectrum receiver is further configured to perform at least one of a plurality of demodulations on a received modulation transmission and generate a demodulation signal based on the performance of the plurality of demodulations, wherein the plurality of demodulations includes a differential phase shift keying (DPSK) demodulation and a non-DPSK demodulation; and
- wherein said decoding is separate from said plurality of demodulations.

4. The portable spread spectrum receiver of claim 3, wherein the audio signal representation represents music.

5. A wireless digital coded audio spread spectrum transmitter operatively coupled to a portable audio player and configured to transmit a unique user code and a representation of an audio signal with a frequency range of 20 Hz to 20 Khz, wherein said digital coded audio spread spectrum transmitter is configured to wirelessly communicate with a digital audio spread spectrum receiver and is configured to be moved in any direction during operation, said wireless digital coded audio spread spectrum transmitter comprising:
- an encoder operative to encode a first representation of an audio signal to reduce intersymbol interference associated with a transmitted representation of the audio signal, said encoder configured to process signals in the frequency range of 20 Hz to 20 kHz for representation in said first representation of an audio signal;
- wherein the wireless digital coded audio spread spectrum transmitter is further configured to perform at least one of a plurality of modulations on the first representation of the audio signal and generate a modulated signal based on the performance of the plurality of modulations, wherein the plurality of modulations includes a differential phase shift keying (DPSK) modulation and a non-DPSK modulation;
- wherein said plurality of modulations are separate from the encoding and processing by the encoder; and
- wherein the wireless digital coded audio spread spectrum transmitter is further configured to use the modulated signal and to use independent code division multiple access communication to wirelessly transmit a transmitted representation of the audio signal, and wherein the transmitted unique user code distinguishes the transmitted representation of the audio signal from other transmitted audio signals in the spread spectrum transmitter spectrum, said other transmitted audio signals not originating from said wireless digital coded audio spread spectrum transmitter.

6. The wireless digital coded audio spread spectrum transmitter of claim 5, wherein the first representation of an audio signal is representative of music.

7. The wireless digital audio spread spectrum receiver of claim 1, wherein said non-DPSK demodulation is 64-ary demodulation.

8. The portable spread spectrum receiver of claim 3, wherein said non-DPSK demodulation is 64-ary demodulation.

9. The wireless digital coded audio spread spectrum transmitter of claim 5, wherein said non-DPSK modulation is 64-ary modulation.

10. The wireless digital audio spread spectrum receiver of claim 1, wherein the digital audio spread spectrum receiver is further configured to receive the receive wireless spread spectrum signal transmissions where the receive wireless spread spectrum signal transmissions are in the Industrial Scientific and Medical 2.4 GHz band, ranging from 2.4 GHz to 2.5 GHz.

11. The portable spread spectrum receiver of claim 3, wherein the portable spread spectrum receiver is further configured to receive the received wireless transmissions where the received wireless transmissions are in the Industrial Scientific and Medical 2.4 GHz band, ranging from 2.4 GHz to 2.5 GHz.

12. The wireless digital coded audio spread spectrum transmitter of claim 5, wherein wireless digital coded audio spread spectrum transmitter is further configured to transmit the transmitted representation of the audio signal where the transmitted representation of the audio signal are in the Industrial Scientific and Medical 2.4 GHz band, ranging from 2.4 GHz to 2.5 GHz.

* * * * *